United States Patent [19]

Porterfield

[11] 3,867,488
[45] Feb. 18, 1975

[54] SPARGER WASTE
[76] Inventor: Hancel W. Porterfield, 1232 Potomac St. N.W., Washington, D.C. 20007
[22] Filed: Dec. 19, 1972
[21] Appl. No.: 316,536

[52] U.S. Cl. ............................. 261/87, 261/DIG. 42
[51] Int. Cl. ................................................. B01f 3/04
[58] Field of Search ................. 261/87, 93, DIG. 42

[56] References Cited
UNITED STATES PATENTS

| | | | |
|---|---|---|---|
| 1,124,855 | 1/1915 | Callow et al. | 261/87 |
| 1,308,587 | 7/1919 | Heuser | 261/87 |
| 2,269,583 | 1/1942 | Dromgold | 261/87 |
| 2,510,427 | 6/1950 | Soucie | 261/121 M |
| 2,873,600 | 2/1959 | Demaret | 261/87 |
| 2,917,372 | 12/1959 | Wallin | 261/87 |
| 2,992,182 | 7/1961 | Elzinga et al. | 261/87 |
| 3,108,146 | 10/1963 | Gross | 261/87 |
| 3,124,131 | 3/1964 | Gross | 261/87 |
| 3,186,700 | 6/1965 | Daman | 261/87 |
| 3,321,082 | 5/1967 | Willinger | 210/169 |
| 3,371,779 | 3/1968 | Hollingsworth et al. | 261/87 |
| 3,382,980 | 5/1968 | Silva | 261/87 |
| 3,677,528 | 7/1972 | Martin | 261/87 |
| 3,722,679 | 3/1973 | Logue | 261/DIG. 75 |
| 3,823,923 | 7/1974 | Chapsal | 261/DIG. 42 |

FOREIGN PATENTS OR APPLICATIONS
1,250,266   11/1960   France .................................. 261/87

Primary Examiner—Tim R. Miles
Attorney, Agent, or Firm—Barry J. Nace

[57] ABSTRACT

A sparger comprising a porous propellor atop a hollow rotatable shaft connected to a gas source and means for rotating the shaft whereby gas forced into the hollow shaft leaves the sparger through the pores of porous blades of the propellor. The sparger is capable of quickly and efficiently dispersing a gas in a liquid and is typically mounted inside a liquid-containing chamber (such as a waste water chamber) in such a manner that the rotatable, hollow shaft enters the chamber through a water tight joint.

The sparger is particularly useful for dispersing oxygen or ozone in the treatment of industrial waste water so that such water may be used in the particular process, and then reused, thereby providing substantial economic savings to the particular industry involved.

11 Claims, 2 Drawing Figures

SPARGER WASTE

CROSS REFERENCE TO RELATED APPLICATIONS

The following application was filed simultaneously with the present application as the sparger of the present invention is particularly useful in the water treatment process described therein, the pertinent portions of which are incorporated herein by reference: U.S. Ser. No. 316,535 filed Dec. 19, 1972, entitled Water Treatment Process, H. W. Porterfield.

BACKGROUND OF THE INVENTION

The present invention is directed to an article of manufacture which is useful for quickly and efficiently dispersing a gas in a liquid and more particularly to apparatus which is useful in a waste water treatment process whereby the waste water can be reused. More particularly this invention is useful in the treatment of waste water of textile, seasonal food processing, and paper re-processing industries so that such water may be reused in the industrial process.

Various attempts have been made in the past to devise a means or method of successfully dispersing a gas in a liquid at a rapid rate and in an economic manner. The use of subsurface agitators and surface aerators has been one method which has been used, but with less than sufficiently successful results, especially where it is necessary to remove substantially all of the pollutants in the waste water. The desirability of introducing a gaseous substance into a liquid has become more apparent as the problem of polluted water has grown. Various methods have incorporated the act of dissolving oxygen in the polluted water. In one particular method set forth in copending U.S. Ser. No. 316,535 filed Dec. 19, 1972 entitled Water Treatment Process, H. W. Porterfield, oxygen is introduced into a secondary treatment mixer and ozone is introduced into a tertiary mixer in order to treat industrial waste water so that it may be reused. It is essential that the oxygen and ozone be dissolved in the waste water as fast as possible for the treatment to be as successful as possible. However, known apparatus is inefficient in accomplishing the quick dissolution of the particular gas.

Other attempts to quickly dissolve a gas in a liquid have frequently included introducing great amounts of the gas into the liquid. However, this is economically undesirable as much of the gas is not dissolved, and hence is wasted. In many industries, the textile industry being typical, it is necessary to use great quantities of water for cleaning purposes and in preparing the final product. However, federal and state regulations prevent the discharge of such used water and the inability to not be able to reuse such water is economically impractical. Thus, various treatment processes have been developed in recent years which have attempted to aerate waste water in order to revitalize the water. However, total success has been lacking for many reasons, one of which is the lack of sufficient aeration means.

It is therefore an object of this invention to provide a means of efficiently and economically dissolving a gas in a liquid.

It is more particularly an object of this invention to describe a sparger which provides for an increased rate of dissolution of a gas in a liquid and which therefore makes a waste water treatment process more economical.

It is further an object of this invention to provide a sparger which can efficiently and economically dissolve oxygen and/or ozone in a liquid.

It is a still further object of this invention to provide a sparger comprising a propellor having pore-containing blades mounted atop a rotatable hollow shaft.

It is yet a further object of this invention to provide a piece of apparatus useful in a waste water treatment process which comprises a sparger of the type described in a container, or receptacle, for holding a liquid wherein the rotatable hollow shaft extends into the container through a water-tight joint.

Other objects of this invention will be apparent to those skilled in the art as the description of this invention proceeds.

BRIEF SUMMARY OF THE INVENTION

The present invention is a sparger having a propellor of porous blades mounted atop a rotatable hollow shaft for the purpose of dissolving a gas in a liquid. The gas is forced through the hollow shaft into the liquid via the porous blades. The sparger is particularly useful in the treatment of industrial waste waters.

DETAILED DESCRIPTION OF THE INVENTION

Figure 1:
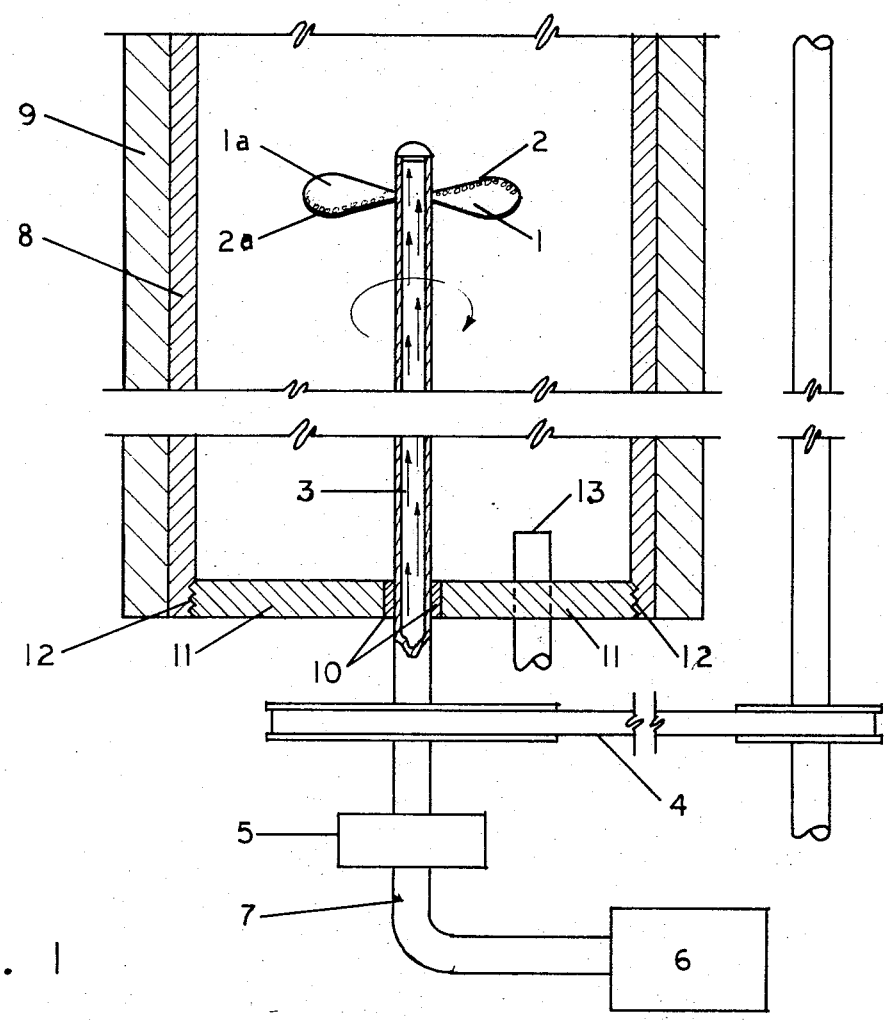
FIG. 1 shows the sparger of this invention as it may typically be used in a waste water treatment process.

Referring first to FIG. 1 there is shown the sparger of this invention when in combination with a liquid receptacle as typically used in a waste water treatment process. Propellor blades 1 and 1a are shown having porous surfaces 2 and 2a. Of course, a propellor having more than two blades is acceptable, but for convenience reference is made herein to two blades. The hollow rotatable shaft 3 supports the blades 1 and 1a and is shown connected to a typical drive means 4 for rotating the shaft, a pulley drive. The gas source 6 is connected to the rotatable hollow shaft 3 via a gas connecting means 7 such as a steel tube. A slip joint 5 is also provided.

The rotatable hollow shaft 3 is shown as being typically inserted into a waste water container 8 which in turn has been inserted into the container coupling 9, through a water tight joint or sealing 10 which then surrounds the rotatable hollow shaft 3. A plug 11 containing the water tight joint 10 may typically be a plastic, such as polyvinyl chloride, tube and may be attached to the container coupling 9 by any means such as screws and screw threads. The attaching means are designated 12. The treated waste water than exits the container 8 via discharge tube 13.

In the operation of the sparger the gas is forced through the rotatable hollow shaft 3 through the porous blades 1 and 1a as the rotatable hollow shaft is being rotated. Typically the distance from the tip of blade 1 to the tip of blade 1a is equal to one-half the width of the container 8 or the radius of the container if such is a circular tube. Thus, the propellor's diameter is typically equal to about one-half the radius of the container if it is a tube or one-half the width of the container when such is rectangular or square in shape.

The blades may preferably be made out of a plastic material, but may also be made of any other material which is not affected by the waste water or gas. A plastic material is preferred as it is most convenient to develop porosity in a plastic material. The blades are themselves basically porous and hollow to allow for as fast a release of the gas which is being forced into the hollow blade through the rotating hollow shaft as is possible. The pores of the blades, while not necessarily of any particular diameter, must be small enough to provide for as great an amount of bubbles as possible to facilitate dissolution. Of course, the size of the pores will depend on the size of the blade, the particular gas used, and the particular type of waste water which is being treated. Further, the pores may be confined to the trailing or leading edges of the blades or may cover the entire surfaces of the blades. The blades will generally have leading and trailing edges and front and rear blade face portions in respect to the direction of travel. The shaft is a hollow tube which can be of any diameter, dependent for example, upon the size of the container into which it is inserted, the size of the propellor, the viscosity of the liquid, the speed of the propellor, etc. The shaft may typically be plastic or metallic. What is of importance is that the shaft be made of a material which will not further pollute the waste water, will be sound and useful economically and will provide good rotational qualities.

The pulley drive, slip joint, gas connecting means, and gas source are all conventional, well-known, and chosen in a manner which will be most economical and efficient to the sparger. Their size and shape may vary according to the type and size of the rotatable hollow shaft, the particular waste water, and the particular gas which is being used.

The waste water container 8 and the container coupling 9 may each quite preferably be plastic, e.g. polyvinyl chloride, tubes, but again, the tubes may be metallic and the material that is used, and the sizes of the container and coupling may vary.

The plug may also be plastic and is attached to the coupling typically by screw threads and includes a center section of a water tight joint which completely surrounds the rotatable hollow shaft as well as supports it. The plug is, in fact, removed from the coupling in order to facilitate insertion and removal of the sparger in the container, i.e. receptacle.

In practice the rotatable hollow shaft is inserted through the water tight joint in the plug and the plug containing the rotatable hollow shaft is then attached to the container with the blades inside the container. The pulley drive, slip joint and gas source are then attached to the protruding end of the shaft.

Figure 2:
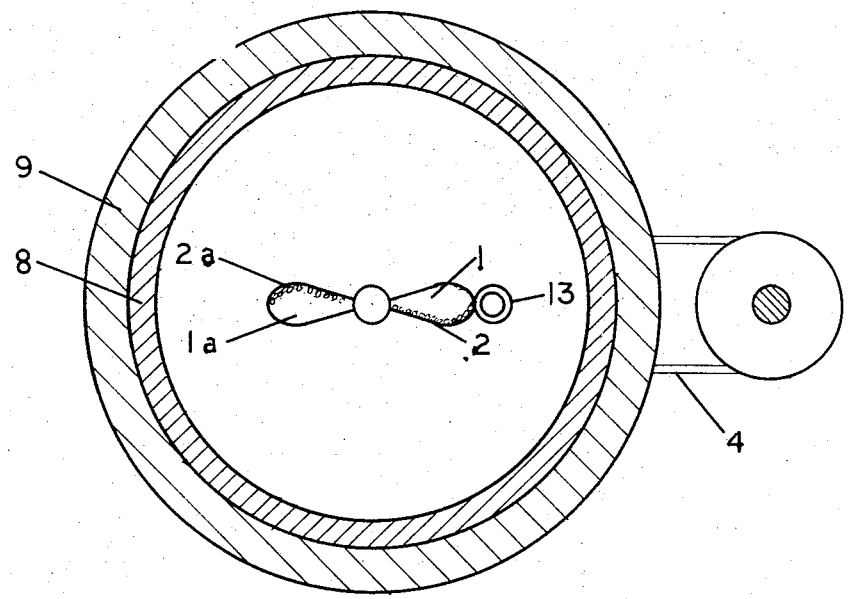
FIG. 2 is a plan view of the sparger in a position to be inserted into the waste water container such as is typically used in a waste water treatment process.

FIG. 2 which is a plan view which more clearly shows the rotatable hollow shaft 3 having been inserted through the water tight joint 10 but not yet attached to the coupling.

It is to be noted that the thus described article of manufacture is particularly useful in the waste water treatment process of copending U.S. Ser. No. 316,535, filed Dec. 19, 1972, entitled Waste Water Treatment Process, H. W. Porterfield, the pertinent sections of which are incorporated herein by reference. In said application there is disclosed a description of a waste water treatment process involving a secondary and tertiary treatment wherein oxygen is introduced into a waste water in the secondary treatment and ozone is introduced into the waste water during the tertiary treatment. In each instance improved results are obtained when the oxygen or ozone are introduced by the sparger as described herein. As further described therein, in a preferred embodiment of said process in the tertiary treatment the apparatus used is modular in construction and several of the herein described spargers can be used in the modular apparatus. Typically a modular tube or container may be 17.2 ft. in height from the center of the propellor blades to the top of the container and ½ foot to 4 feet in diameter, preferably ½ foot to 1 foot. Then, the rotatable hollow shaft and propellor blades extend about 1–1½ feet into the container, when the container is about ½ foot in diameter. However, the height of the shaft in the container is also dependant upon other factors such as the diameter of the container, etc. In such case (when the container is ½ foot in diameter) the shaft is about ½ inch or less in diameter and the distance from the tip of one blade to the tip of the opposite blade when mounted on a shaft is about 3 inches. The waste water flows either concurrently with or countercurrently to the flow of the gas within the hollow shaft depending upon whether the flow of the gas is concurrent or countercurrent and is discharged at the bottom or top of the container after being enriched with oxygen or ozone by the sparger of this invention.

It is also to be understood that sufficient gas space must be retained at the top of the container in order to provide a partial pressure within the container to maximize the effect of the sparger.

What is claimed is:

1. Apparatus for dissolving a gas in an industrial waste water comprising:
   a. a receptacle for receiving a waste water, said receptacle containing a removable screw-out plug;
   b. a sparger comprising a rotatable hollow shaft and a hollow propellor mounted atop said rotatable hollow shaft, said propellor having a leading edge and a trailing edge, each of said edges containing pores through which a gas is dispersed;
   c. drive means for rotating said sparger;
   d. a gas source;
   e. connecting means for connecting said gas source to said sparger;
   f. a slip joint for connecting said rotatable hollow shaft of said sparger and said connecting means;
   g. a water-tight sealing surrounding said rotatable hollow shaft of said sparger, said water tight sealing being mounted securely within said plug; and
   h. means for attaching said plug to said receptacle, whereby said industrial waste water may be reused in the industrial process from where it was derived.

2. The apparatus according to claim 1 wherein said propellor is plastic.

3. The apparatus according to claim 1 wherein said propellor is polyvinyl chloride.

4. The apparatus according to claim 1 wherein said receptacle is a tube and said propellor has a diameter equal to one-half the radius of the tube.

5. The apparatus according to claim 1 wherein said entire propellor is porous.

6. The apparatus according to claim 1 wherein said drive means is a pulley.

7. The apparatus according to claim 1, wherein said gas is selected from the group consisting of oxygen and ozone.

8. Apparatus for dissolving a gas selected from the group consisting of oxygen and ozone in a textile waste water comprising:
   a. a receptacle for receiving a textile waste water, said receptacle containing a removable screw-out plug;
   b. a sparger comprising a rotatable hollow shaft and a hollow propellor mounted atop said rotatable hollow shaft, said propellor having a leading and trailing edge, each of said edges containing pores through which a gas is dispersed;
   c. drive means for rotating said sparger;
   d. a source of said gas;
   e. connecting means for connecting said source of said gas to said sparger;
   f. a slip joint for connecting said rotatable hollow shaft of said sparger and said connecting means;
   g. a water tight sealing surrounding said rotatable hollow shaft of said sparger, said water tight sealing being mounted securely within said plug; and
   h. means for attaching said plug to said receptacle, whereby said textile waste water may be reused in a textile process.

9. The apparatus according to claim 8, wherein said "a", "b", and "e" are not chemically affected by said waste water or said gas.

10. The apparatus according to claim 8, wherein said entire propellor is porous.

11. The apparatus according to claim 8, wherein said drive means is a pulley.

* * * * *